United States Patent [19]
Soltis et al.

[11] Patent Number: 4,805,769
[45] Date of Patent: Feb. 21, 1989

[54] COMPACT DISC SECURITY HOLDER

[75] Inventors: Joseph R. Soltis, Shoreview; Robert E. Montrose, Plymouth, both of Minn.

[73] Assignee: Liberty Diversified Industries, New Hope, Minn.

[21] Appl. No.: 174,197

[22] Filed: Mar. 28, 1988

[51] Int. Cl.⁴ ............................................. B65D 85/30
[52] U.S. Cl. .................................. 206/309; 206/45.14; 206/387; 206/807; 206/1.5
[58] Field of Search ...................... 206/309, 45.14, 1.5, 206/312, 387, 807, 444

[56] References Cited

U.S. PATENT DOCUMENTS

| | | | |
|---|---|---|---|
| 3,650,382 | 3/1972 | Braun et al. | 206/45.14 |
| 3,776,374 | 12/1973 | Medendorp | 206/45.14 |
| 4,285,429 | 8/1981 | MacTavish | 206/1.5 |
| 4,366,915 | 1/1983 | Seidler | 206/1.5 |
| 4,381,836 | 5/1983 | Rivkin et al. | 206/807 |
| 4,561,544 | 12/1985 | Reeve | 206/807 |
| 4,572,369 | 2/1986 | Morris | 206/807 |
| 4,589,549 | 5/1986 | Hehn | 206/1.5 |
| 4,634,004 | 1/1987 | Mortensen | 206/807 |
| 4,714,161 | 12/1987 | Thorud | 206/807 |
| 4,718,547 | 1/1988 | MacTavish | 206/387 |

*Primary Examiner*—David T. Fidei
*Attorney, Agent, or Firm*—Moore & Hansen

[57] ABSTRACT

A compact disc security holder comprised of a base section and pivoting lid member connected to the base section by a hinge panel. The base section has side walls defining a compartment region with an open section and an enclosed section, the lid member having pivoting into alignment over the open section to thereby enclose it. The lid member has several flat depending barbs which engage within slots in the side walls of the base section. A pivotal retaining member defined by and hingedly connected to the bottom wall of the base section may be pivoted upwardly to engage the lid member and divide the compartment region into a pair of subcompartments each having different lengths.

16 Claims, 3 Drawing Sheets

COMPACT DISC SECURITY HOLDER

BACKGROUND OF THE INVENTION invention relates to security holders used to prevent the theft of prerecorded media from retail stores, and particularly to a security holder for compact discs.

Compact discs (CDs) present a relatively new form of non-magnetic recording media which are growing in popularity proportionally with the increasing sales of compact disc players.

The compact discs themselves are thin, flexible plastic resin sheets with a digitally recorded, engraved pattern. The compact discs resemble small vinyl phonograph records which are made from transparent plastic, and in which the embedded "grooves" are barely visible except for the diffraction patterns they create in white light. A laser enclosed in the compact disc player directs one or more beams onto the surface of the compact disc at a constant angle of deflection, at least one beam being reflected off the disc at varying angles dependent upon the engraved pattern. In simplest form, a reflected beam would be directed either at or away from a photoelectric receiver, thus creating a binary series of pulses corresponding to the digital recording, which are then converted back into an analog signal or directly into audio sound. Compact discs are manufactured according to set standards and specifications promulgated by the N. V. Philips' Gloeilampenfabrieken of Eindohoven, the Netherlands, and the Sony Corporation of Tokyo, Japan.

Compact discs and compact disc players are used for a variety of data recording and retrieval purposes, including microcomputer read-only-memory (CD-ROM) systems and interactive video. The largest market for compact discs, however, is currently prerecorded stereo music, wherein compact discs are quickly replacing phonograph records and magnetic tape cassettes.

Although compact discs are substantially more expensive than phonograph records or magnetic tape cassettes, compact discs are generally preferred because they provide greater longevity and sound quality than either records or tapes. Compact discs are comparable to magnetic tape cassettes in their size and portability, and compact disc players are now being manufactured with dimensions similar to those of cassette tape recorders. The increased cost of the prerecorded compact discs therefore makes them ready targets for theft from retail stores.

Prerecorded compact discs are conventionally placed on a molded plastic rectangular support card having a beveled hub which is engaged in the central hole of the compact disc, with the support card then being received within a transparent plastic rectangular outer case having a pivotal lid. These plastic outer cases generally have minimum and maximum dimensions conforming to industry standards, but may otherwise be constructed in a variety of manners, one example being shown in U.S. Pat. No. 4,613,044.

The compact discs are then generally sold in one of four display packaging formats. One or more sheets of printed advertising material similar to that contained in a record jacket may be placed directly within the plastic outer case, thus identifying the contents of the compact disc within the case, and sold in this form. The plastic outer case may also be inserted into a paperboard or fiberboard box having dimensions slightly greater that the plastic outer case, with the box itself having the advertising and content information printed thereon. The plastic outer case and printed materials may be packaged side by side in a two compartment, two piece flexible plastic bubble pack which has either a hinged lid or two separate components which are pressed together in locking engagement. Such a package may also be designed to contain a set of two compact discs and the associated printed material. Finally, one or two of the plastic outer cases and the printed materials may be inserted in a larger cardboard or paperboard box, which is similarly printed with advertising and content information.

Compact disc holders for storing a plurality of compact discs are also known. U.S. Pat. No. 4,535,888 discloses a storage case for two or more compact discs comprising an intermediate bottom member with opposing pivotal lids, the bottom member of the storage case receiving and retaining compact discs in much the same fashion as described for the outer plastic cases above. U.S. Pat. No. 4,647,117 discloses a container for compact discs in which each disc is stored in a sliding drawer-like tray movable into and out of a housing by spring-biasing.

While devices similar to the above plastic outer cases and compact disc holders provide protection for the compact disc and permit more convenient use thereof, they do not serve the function of preventing the compact discs from being shoplifted from retail stores.

A similar problem was encountered with conventional magnetic tape cassettes and eight track tapes, which are more easily concealed on a person and surreptitiously removed from a store that larger phonograph albums. Initially, merchants dealt with the problem of cassette tape theft by locking the cassettes in display cases which permitted the cassettes to be viewed but not removed, and then by placing the cassettes in security holders and equipping the doors of the display cases with apertures smaller than the security holders such that the customers could reach through the apertures but not remove them completely from the display case.

The security holders have subsequently been modified to include enhanced tamper resistant closures to prevent the cassettes tapes from being removed from the security holders, and enlarge so that the security holders cannot be easily concealed by a person, thereby permitting the cassettes and security holders to be placed in open racks and display cases to avoid the necessity of having sales personnel unlock the closed display cases each time a customer wishes to purchase a cassette. Representative examples of such security holders are in shown U.S. Pat. Nos. 3,587,837; 3,675,763; 3,776,374; 3,828,922; 3,871,516; and 4,245,741.

Of particular interest is the anti-theft point-of-sale container disclosed in U.S. Pat. No. 4,381,838. The '836 security holder has a walled body section and pivotally hinged lid member defining a compartment region, and is designed to be used with either magnetic tape cassettes or eight track tapes. The body section and lid member are sized to receive up to two tape cassettes or a single eight track tape, with molded ribs being positioned to firmly secure one or two tape cassettes or a single eight track tape between the body section and lid member. The lid member include flat barbs which project downwardly and are engaged in aligned slots defined by the side walls of the body section to secure the lid member to the body section. The tape cassettes or eight track tape are removed by the purchaser by cutting or slicing through a weakened line in the hinge member connecting the body section and lid member. The security holder also includes a handle section which increases the overall size of the security holder to make concealment more difficult, and to make the security holder more convenient to carry while shopping or until the contents are removed.

Security holders were originally designed so that the tape cassettes could be removed by the sales personnel at the checkout counter and the security holders then reused. It has now become accepted practice to leave the tape cassettes in the security holders, and allow the customer to remove the tape cassette and dispose of the security holder.

There are several common disadvantages which designers of security holders for tape cassettes and other similar items seek to achieve.

One advantage is to design the security holder such that is inexpensive to manufacture and consumes a minimum of materials, so as not to unduly increase the cost of either the finished security holder nor the retail item. Another design objective is to effectively limit an individual's ability to conceal the security holder, and thereby aid in the detection of shoplifters and prevent items being removed from the store premises. A related design advantage is found in making the closure of the security holder difficult to tamper with, to prevent removal of the tape cassette or other items from the security holder while the individual is in the store. A similar advantage is to design the security holder such that store personnel may quickly insert and secure the items within the security holder. A distinct advantage is achieved in designing a security holder which will securely receive one or more different items, such as in the case of the above referenced container usable with either tape cassettes and eight track tapes.

BRIEF SUMMARY OF THE INVENTION

It is therefore one object of this invention to design a compact disc security holder which can be utilized with each of the several existing display packaging formats used by those companies distributing prerecorded compact discs.

It is a related object of this invention to design the above compact disc security holder such that the appropriate sizing may be quickly and easily selected by the person placing the compact disc packages within the security holders.

It is another object of this invention to design the above compact disc security holder such that it has enhanced antitamper characteristics, making unauthorized removal of the compact discs from the security holder more difficult.

Described briefly, the compact disc security holder of this invention it comprised of a base section and a pivoting lid member connected to the base section by a hinge panel. The base section has side walls defining a compartment region with an open section and a partially enclosed section, the lid member pivoting into alignment over the open section to thereby enclose it. The lid member has several flat depending barbs which engage within slots in the side walls of the base section. In one embodiment, a pivotal retaining member defined by and hingedly connected to the bottom wall of the base section may be pivoted upwardly to engage the lid member and divide the compartment region into a pair of subcompartments each having different lengths corresponding to one of the existing compact disc display packages. The base section and lid member have a double wall construction which makes twisting and flexing the side walls more difficult, while horizontal ledges within the slots make the flat barbs more difficult to remove from the slots.

DESCRIPTION OF THE PREFERRED EMBODIMENTS

The compact disc security holder of this invention is shown in the accompanying FIG. 1-9 and referred generally therein by the numeral 10.

Figure 1:
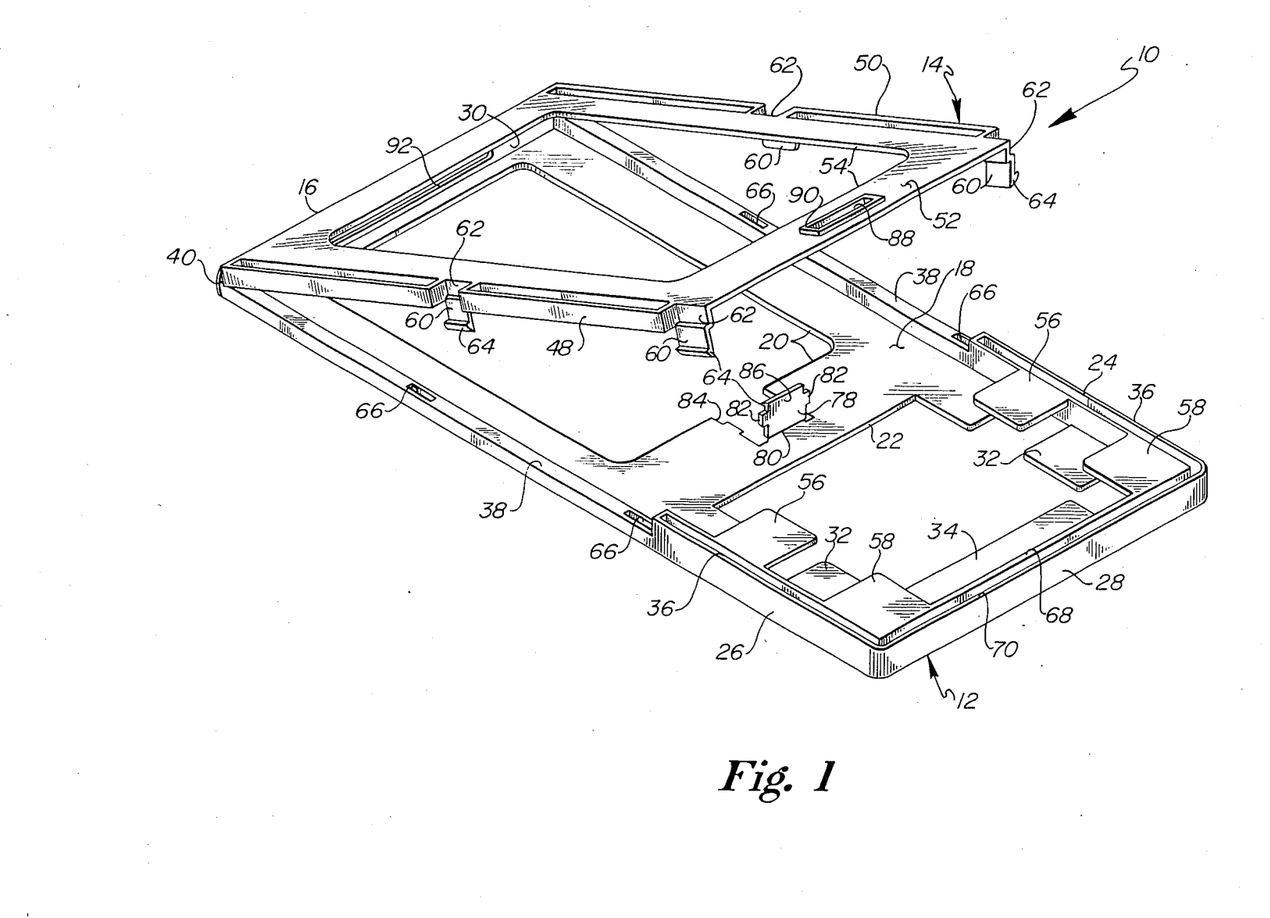
FIG. 1 is a perspective view of the compact disc security holder of this invention shown in the partially closed position.

Referring to FIG. 1, it may be seen that the compact disc security holder 10 is comprised of a base section 12 and a lid member 14 pivotally connected to the base section 12 at the rear end 16 thereof.

The base section 12 has a bottom wall 18 extending substantially the entire length of the base section 12, and defining a first bottom viewing aperture 20 and a smaller second bottom viewing aperture 22. The base section 12 also has a pair of opposing side walls 24, 26 and a pair of opposing end walls 28, 30. The bottom wall 18 adjacent the second viewing panel 22 and the end wall 28 is completed by a pair of generally square bottom wall tabs 32 extending inwardly partially from the bottom edge of the opposing side walls 24, 26 and a generally rectangular bottom wall tab 34 extending inwardly partially from the end wall 28 generally parallel to and co-planar with the bottom edge of the bottom wall 18. It is understood that various other embodiments of the tab configuration described may be employed, including the use of a single rectangular bottom wall 34 which is connected only to the end wall 28 and extends inwardly several times the distance shown in FIG. 2 without the presence of the square bottom wall tabs 32, or alternately, a single generally U-shaped bottom wall tab (not shown) may extend inwardly from and be connected to the end wall 28 and both of the side walls 24, 26.

Each side wall 24, 26 has a raised segment 36 and a lower segment 38. The lower segment 38 has a length substantially equal to the length of the lid member 14, and is adjacent to the end wall 30. The raised segment 36 is adjacent to the end wall 28 and has a height equal to the raised sections 36 of the side walls 24, 26.

Figures 2, 3, 4, 5, 6:
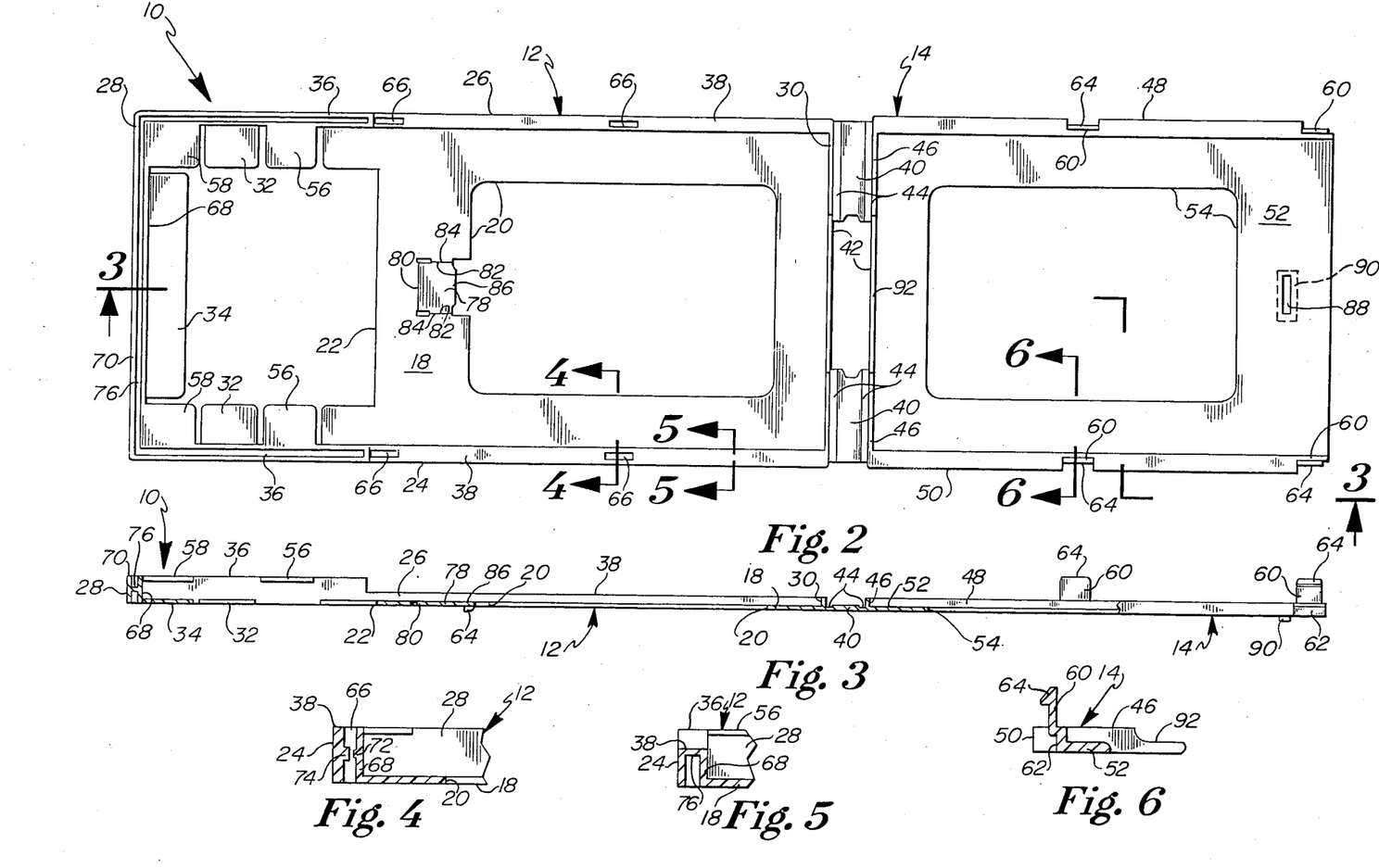
FIG. 2 is a top plan view of the compact disc security holder of FIG. 1.
FIG. 3 is a cross sectional view of the compact disc security holder taken through line 3—3 of FIG. 2.
FIG. 4 is a cross sectional view of the compact disc security holder taken through line 4—4 of FIG. 2.
FIG. 5 is a cross sectional view of the compact disc security holder taken through line 5—5 of FIG. 2.
FIG. 6 is a cross sectional view of the compact disc security holder taken through line 6—6 of FIG. 2.

Referring to FIG. 2, it may be seen that the lid member 14 is connected to the base section 12 by a pair of hinge panels 40 which define an end viewing panel 42 therebetween. Referring to FIG. 3, it may be seen that each hinge panel 40 has a pair of opposing thin web segments 44 connecting the hinge panels 40 to the base section 12 to the lid member 14.

Referring again to FIG. 2, it may be seen that the lid member 14 has an end wall 46, a pair of opposing side walls 48, 50, and a top wall 52. The top wall 52 defines a top viewing aperture 54 corresponding in dimensions to the first viewing aperture 20 of the base section 12.

The height of the side walls 48, 50 of the lid member 14 measured the top and bottom edges of the side walls 48, 50, as well as the height of the side walls 24, 26 of the lower segment 38 of the base section 12, are approximately one half the height of the raised segment 36 of the base section 12. The lid member 14 may thus be pivoted across the thin web segments 44 of the hinge panels 40 into aligned contact with the base section 12 such that the side walls 48, 50 of the lid member 14 are parallel and coterminous with the side walls 24, 26 of the lower segment 38 of the base section 12.

A pair of top wall tabs 56 extending inwardly partially from the top edge of each of the side walls 24, 26, and a pair of top corner wall tabs 58 each extending partially inwardly from the top edge of one of the side walls 24, 26 and the end wall 28 of the base section 12 measured between the top and bottom edges thereof, are positioned generally parallel to and co-planar with the top wall 52 of the lid member 14 when the lid member 14 is pivoted into overlaying contact with the lower segment 38 of the side walls 24, 26 of the base section 12. Referring to FIGS. 1 and 2, it may be seen that the square bottom wall tabs 32, rectangular bottom wall tab 34, top wall tabs 56, and top corner wall tabs 58 are positioned in an alternating arrangement wherein none of the perimeters of the tabs 32, 34, 56, 58 overlap one another vertically to any substantial extent. As such, the top wall tabs 56 and top corner tabs 58, and the square bottom wall tabs 32 and rectangular bottom wall tab 34 partially but continuously enclose the interior region of the compact disc holder adjacent the raised segment 36 thereof. Conversely, the lid member 14 encloses the interior region of the compact disc security holder 10 only when the lid member 14 is pivoted to the closed position closely confronting the base section 12.

Referring again to FIG. 1, it may be seen that depending from each of the side walls 48, 50 of the lid member 14 are a pair of flat barb members 60. As shown in FIGS. 1 and 6, each flat barb member 60 is attached to a recessed and single walled portion 62 in the side wall 48, 50, such that an angled tine 64 faces outward away from the interior of the lid member 14.

Each flat barb member 60 is positioned and aligned to be received in a corresponding double walled slot 66 defined in the lower section 38 of the side walls 24, 26 of the base member 12. As shown in FIG. 4, each slot 66 is defined by an inner side wall member 68 and an outer side wall member 70 spaced apart a distance approximately equal to or slightly wider than the thickness of the angled tines 64 of the flat barb members 60. The inner side wall member 68 includes a smaller first horizontal ledge 72, and the outer side wall member 70 includes a larger second horizontal ledge 74, each ledge 72, 74 being approximately the same height relative to one another. It is understood that the position of the flat barb members 60 and slots 66 may be interchanged so that the barb members 60 extend from the base section 12 and the apertures 66 defined by the lid member 14.

The recesses 62 in the side walls 48, 50 each have a depth approximately equal to the width of the slots 66 plus the thickness of the outer side wall member 70, such that the flat barb members 60 are aligned to be inserted through and received within the slots 66 between the inner and outer side wall members 68, 70 with the first horizontal ledges 72 of the inner side wall members 68 pressing against the inner surfaces 74 of the flat barb members 60 thereby urging the angled tines 64 outwardly so as to securely engage under the second horizontal ledges 74 of the outer side wall members 70.

Referring to FIG. 5, it may be seen that the side walls 24, 26 of the lower section 38 of the base section 12 have an inverted U-shaped double wall construction comprising an inner side wall member 68 and outer side wall member 70 connected by an intermediate bridge member 76, the intermediate bridge member 76 also forming the to surface of the side walls 24, 26. Similarly, the side walls 48, 50 of the lid member 14 have the same U-shaped double wall construction as the side walls 24, 26 of the lower section 38 of the base section 12 described above. Referring to FIG. 3, it may be seen that the side walls 24, 26 and end wall 8 of the raised section 36 have a generally H-shaped construction comprising an inner side wall member 68 and an outer side wall member 70 spaced apart and connected by an intermediate bridge member 76. The end wall 30 of the base section 12 and the end wall 46 of the lid member 14 adjacent the hinge panels 40 are formed from a single wall construction as shown in FIG. 3 which is generally equivalent to the outer wall member 70 of the side walls 24, 26, 48, 50.

A T-shaped pivotal retaining member 78 is defined by and hingedly connected at one end to the bottom wall 18 of the base section 12 along a Weakened score line 80. The pivotal retaining member 78 has a pair of opposing retaining tabs 82 extending from each side of the pivotal retaining member 78, the retaining tabs 82 initially being connected to the bottom wall 18 by a thin web segments or weakened score lines 84. The free edge 86 of the pivotal retaining member 78 opposing the score line 80 has rounded or beveled corners, and includes an angled tine 64 similar to those of the flat barb members 60.

The pivotal retaining member 78 is positioned on the bottom wall 18 of the base section 12 such that when the pivotal retaining member 78 is pivoted to an upright position perpendicular to the bottom wall 18, the free edge 86 of the pivotal retaining member 78 will be aligned with a retaining member engaging slot 88 defined by the top wall 52 of the lid member 14. The retaining member engaging slot 88 is bounded on each side by a reinforcing wall 90.

Referring again to FIG. 1, it may be seen that the side walls 24, 26 and end walls 28, 30 of the base section 12, in combination with the side walls 48, 50 and end wall 46 of the lid member 14, the square bottom wall tabs 32, rectangular bottom wall tab 34, top wall tabs 56, and top corner wall tabs 58, cooperate to form a compartment region in the compact disc security holder 10. This compartment region may be further subdivided into two subcompartment regions of differing lengths by pivoting the pivotal retaining member 78 upward away from the bottom panel 18. The smaller or normally enclosed subcompartment region is defined by the raised section 36 of the side walls 24, 26 and end wall 28 of the base section 12, the bottom panel 18, square bottom wall tabs 32, rectangular bottom wall tab 34, top wall tabs 56, and top corner wall tabs 58, and pivotal retaining member 82. The larger or normally open subcompartment region is defined by the lower section 38 of the side walls 24, 26 and end wall 30 of the base section 12, the bottom panel 18, and pivotal retaining member 82, and is thereby enclosed by the side walls 48, 50, end wall 46, and top wall 52 of the lid member 14.

Each single construction end wall member 30, 46 may also define a recessed region 92 corresponding to the end aperture 42 between the hinge panels 40, with each end wall member 30, 46 extending over a sufficient region to prevent the compact disc from being removed from the rear end 16 of the compact disc security holder 10. Similarly the bottom panel 18 of the base section 12 surrounding the first viewing aperture 20, square bottom wall tabs 32, rectangular bottom wall tab 34, top wall tabs 56, top corner wall tabs 58, and top wall 52 surrounding the top viewing aperture 54 should extend inwardly from the side walls 24, 26, 48, 50 a distance sufficient to prevent the compact disc from being removed from the compact disc security holder 10, yet should also permit a maximum area for viewing the compact disc package through the viewing apertures 20, 22, 54, 42.

In operation, several of the like compact disc security holders 10 may be packaged or stacked together in a carton in the completely open or unfolded position shown in FIG. 3. Several like compact discs (not shown) may also be contained in a carton or similar container, depending upon the form in which the compact discs are shipped to the store. The compact discs may be in any one of several display packages previously described and conventionally used for retail sales.

The store personnel may select and remove a compact disc display package and one of the compact disc security holders 10 from their respective cartons, and determine which configuration of the compact disc security holder 10 is best suited for containing and securing the packaged compact disc.

If a large display package is being utilized with the compact disc, such as a double sized printed paperboard box or the two compartment bubble pack, the largest or main compartment of the compact disc security holder 10 would be appropriate.

The store personnel then slides the packaged compact disc into the enclosed region end of the compact disc security holder 10 between the square bottom wall tabs 32 and rectangular bottom wall tab 34 and the opposing top wall tabs 56 and top corner wall tabs 58. The lid member 14 is then folded or pivoted across the web segments 44 of the hinge member 40, to thereby bring the lid member 14 into vertical alignment over the base section 12. The flat barb members 60 are each inserted into the corresponding slots 66 and pressed therethrough until each of the angled tines 63 engage under the second horizontal ledge 74 of each slot 66.

It is understood that alternate embodiments of the compact disc security holder 10 of this invention may prove suitable or preferable in various applications. One such embodiment is shown generally in FIGS. 7-9.

Figure 7:
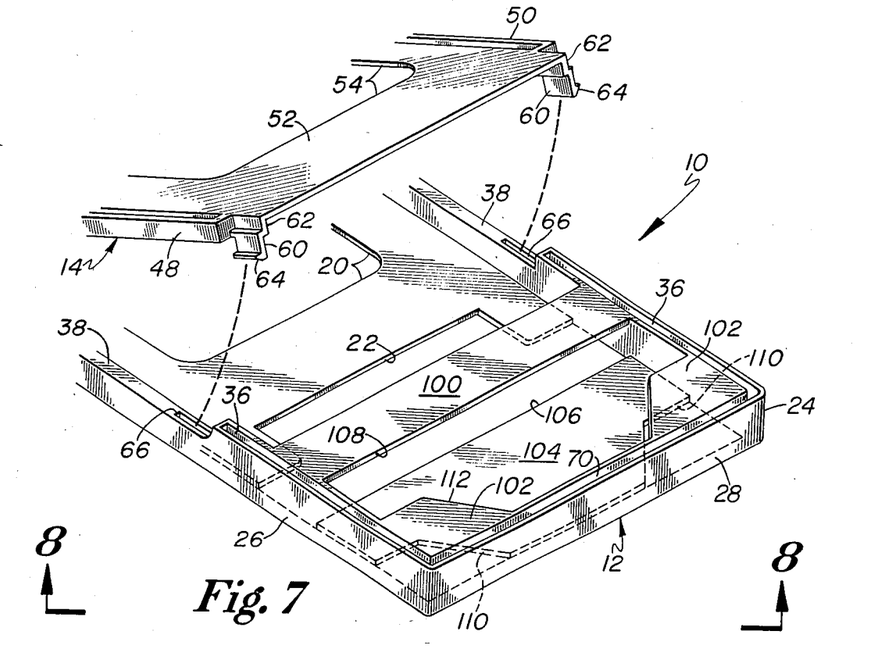
FIG. 7 is a perspective view of the enclosed end of a modified embodiment of the compact disc security holder of FIG. 1.

Referring to FIG. 7, it may be seen that the general design of the compact disc security holder 10 is similar to that shown in FIG. 1 concerning the construction of the side walls 24, 26, end walls 28, 30 lower and raised segments 36, 38, lid member 14, and the larger and normally open subcompartment region of the base section 12, as described above.

Figure 8:
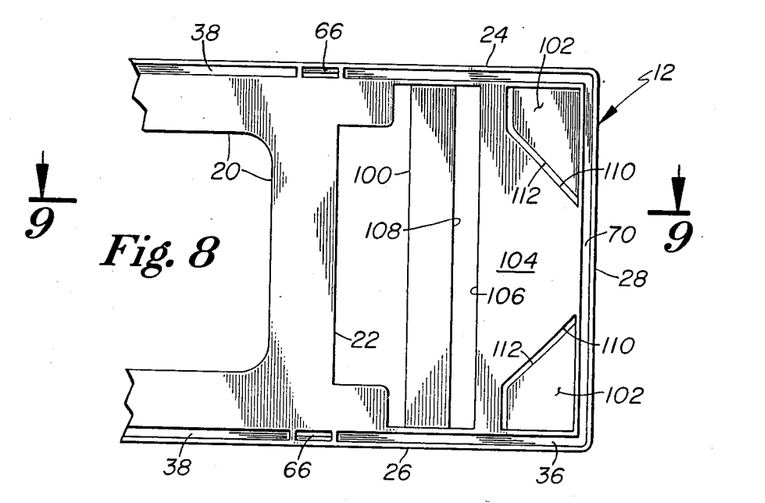
FIG. 8 is a bottom view of the compact disc security holder taken through line 8—8 of FIG. 7.
Figure 9:
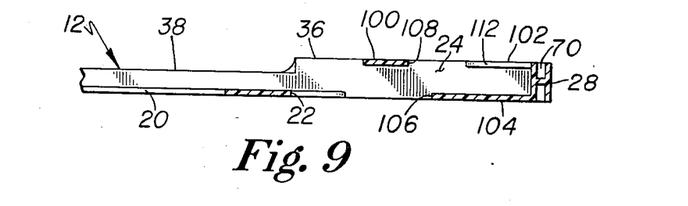
FIG. 9 is a cross sectional view of the enclosed end of the compact disc security holder taken through line 9—9 of FIG. 8.

As shown in FIG. 7, the smaller and normally enclosed subcompartment region of the compact disc security holder 10 of the alternate embodiment is modified from that shown in FIG. 1. The pivotal retaining member 82, and the retaining member engaging slot 88 in the top wall 52 of the lid member 14, may be omitted. Rather than a pair of top wall tabs 56, a single top retaining strip 100 extends across the top of the subcompartment between two points on the side walls 24, 26 at a generally perpendicular angle thereto. Similarly, in place of the generally rectangular top corner wall tabs 58, the alternate embodiment shown in FIG. 7 includes a pair of opposing angled top corner tabs 102 which extend generally perpendicularly from the adjacent side wall 24, 26 a short distance, and then at an acute angle relative to the end wall 28. The square bottom wall tabs 32 and rectangular bottom wall tabs 34 may be replaced by a generally T-shaped bottom retaining section 104 which extends from and is connected to both the side walls 24, 26 and end wall 28. The bottom retaining section 104 as shown in FIGS. 8 and 9 defines an edge 106 opposing the end wall 2B which extends generally perpendicularly between the side walls 24, 26 and is spaced apart from the edge 108 of the top retaining strip 100 closest to the end wall 28 such that the top retaining strip 100 and bottom retaining section 104 do not overlap vertically. Similarly, the bottom retaining section 104 defines a pair of corner cutouts 110 adjacent the corners and bounded by the bottom retaining section 104, the side walls 24, 26 and the end wall 28, and spaced apart from the edges 112 of the opposing angled top corner tabs 102 such that the angled top corner tabs 102 do not vertically overlap the bottom retaining section 104. As such, the top retaining strip 100 and angled top corner tabs 102 are preferable not disposed vertically over the bottom retaining section 104 as shown in FIGS. 8 and 9. In this manner, a minimal amount of material may be sued without dissipating the protective or anti-tamper features of the compact disc security holder 10.

While the preferred embodiments of the compact disc security holder 10 of this invention has been described with reference to the attached drawings, it is understood that certain changes and modification may be made without departing from the spirit and scope of the appended claims.

What is claimed is:

1. A compact disc security holder to engagingly receive at least one of a plurality of different compact disc display packages, said compact disc security holder comprising:

a base section, said base section including a pair of opposing side walls and a pair of opposing end walls, each said end wall connected to and extending between each of said side walls, each said side wall defining a lower segment having a top edge and a bottom edge and a height measured therebetween, and a raised segment having a top edge and a bottom edge and a height measured therebetween which is greater than said height of said lower segment, said lower segment of each said side wall of said base section having a length, said side walls and said end walls of said base section defining an interior region of the compact disc security holder;

a lid member, said lid member having a pair of opposing side walls, said side walls having a pair of opposing ends and a length measured therebetween, said lid member being hingedly connected to the base section adjacent one of the end walls thereof and being pivotable between a closed position whereat each of said side walls of said lid member closely confronts one of the side walls of the base section, and an open position generally displaced from said closed position, each said side wall of said lid member having a length being generally equal to or less than the length of the lower segment of the side wall of the base section confronting said side wall of said lid member when said lid member is pivoted to said closed position;

securing means for engagingly securing the lid member in close confronting contact with the base section when the lid member is pivoted to the closed position;

a top wall connected to and extending between the side walls of the lid member;

a bottom wall connected to and extending between the side walls of the base section, said bottom wall and the top wall at least partially enclosing the interior region of the compact disc holder adjacent the lower segment thereof when the lid member is pivoted to the closed position;

at least one tab extending partially inwardly from the top edge of the raised segment of the base section; and at least one tab extending inwardly from the bottom edge of the raised segment of the base section, said tab extending partially inwardly from the bottom edge of the raised segment of the base section continuously enclosing the interior region of the compact disc holder adjacent the raised segment thereof;

whereby at least one of the plurality of different compact disc display packages may be selectively inserted and received within the interior region of the compact disc holder adjacent the lower segment thereof when the lid member is in the open position, at least a portion of the compact disc display package being slidably receivable within the partially enclosed portion of the interior region of the base section adjacent the raised segment thereof, with the lid member being pivotable to the closed position and securable thereat.

2. The compact disc security holder of claim 1 wherein the number of tabs extending partially inwardly from the top edge of the raised segment of the base section is four, two of said tabs extending inwardly from the top edge of the raised segment each being connected directly to and extending from only one of the opposing side walls of the base section, and two of said tabs extending inwardly from the top edge of the raised segment being connected directly to and extending from both the end wall adjacent the raised segment and only one of the side walls of the base section, such that two tabs extend inwardly from the top edge of each of the side walls of the base section adjacent the raised segment, and wherein the number of tabs extending partially inwardly from the bottom edge of the raised segment of the base section is three, one of said tabs extending inwardly from the bottom edge of the end wall adjacent the raised segment, two of said tabs extending inwardly from the bottom edge of the raised segment each being connected only to and extending only from one of the side walls of the base section, such that one tab extends inwardly from the bottom edge of each side wall of the base section adjacent the raised segment.

3. The compact disc security holder of claim 2 wherein each of the tabs has a perimeter edge, each of the tabs being positioned such that said perimeter edges of the tabs extending inwardly from and connected to the top edge of the raised segment of the base section do not substantially overlap in vertical alignment with any of said perimeter edges of the tabs extending inwardly from and connected to the bottom edge of the raised segment of the base section.

4. The compact disc security holder of claim 1 wherein the number of tabs extending partially inwardly from the top edge of the raised segment of the base section is two, said tabs extending inwardly from the top edge of the raised segment each being connected directly to and extending from both the end wall adjacent the raised segment of the base section and only one of the side walls of the base section, such that the one tab extends inwardly from the top edge of each of the side walls of the base section adjacent the raised segment, each said tab extending inwardly from the top edge of the raised segment having an edge extending at a generally acute angle relative to the end wall adjacent the raised segment of the base section.

5. The compact disc security holder of claim 4 further comprising:

a retaining strip member connected at least at two points to the top edge of the raised segment of the base section, said retaining strip member extending between the side walls of the base section at a generally perpendicular angle thereto.

6. The compact disc security holder of claim 4 wherein the tab extending inwardly from the bottom edge of the raised segment of the base section extends from and is connected to each of the side walls of the base section and extends from and is connected to the end wall of the base section adjacent the raised segment thereof, said tab extending inwardly from the bottom edge of the raised segment of the base section further defining a pair of corner apertures, each said corner aperture being bounded by the tab extending inwardly from the bottom edge of the raised segment, the end wall of the base section adjacent the raised segment thereof, and one of the side walls of the base section.

7. The compact disc security holder of claim 6 wherein each of the tabs extending from the top edge of the raised segment of the base section has a perimeter edge, and wherein each of the corner apertures defined by the tab extending from the bottom edge of the raised segment of the bottom section has a perimeter, each of the tabs being positioned such that said perimeter edges of the tabs extending inwardly from and connected to the top edge of the raised segment of the base section do not substantially overlap in vertical alignment with any of said perimeter edges of the apertures defined by the tab extending from the bottom edge of the raised segment of the bottom section has a perimeter.

8. The compact disc security holder of claim 1 for receiving a first or a second compact disc display packages having different dimensions, said compact disc security holder further comprising:

a pivotal retaining member, said pivotal retaining member being defined by the bottom wall of the base section and being hingedly connected thereto along a first end, said pivotal retaining member having a length greater than the distance between the top wall and the bottom wall when the lid member is pivoted to the closed position, said pivotal retaining member further having a second end opposing said first end and being aligned with and engagingly received within a retaining aperture defined by the top wall of the lid member when the pivotal retaining member is pivoted to a retaining position generally perpendicular to the bottom wall and the lid member is pivoted to the closed position, such that the pivotal retaining member extends between the top wall of the lid member and the bottom wall of the base section so as to divide the interior region of the compact disc security holder into a first subcompartment and a second subcompartment, said first and second compartments each corresponding to the dimensions of the first compact disc display package and said second subcompartment corresponding to the dimensions of the second compact disc display package.

9. The compact disc security holder of claim 1 which may be opened by a user, said compact disc security holder further comprising:
   at least one hinge panel extending from and hingedly connected to the lid member and to the base section adjacent one of the end walls thereof; and
   opening means for opening said compact disc security holder, said opening means including at least one thin web segment defined by the hinge panel, said thin web segment being easily cut by the user to permit the compact disc display package to be removed from the interior region of the compact disc security holder.

10. The compact disc security holder of claim 1 wherein the securing means for engagingly securing the lid member in close confronting contact with the base section when the lid member is pivoted to the closed position further comprises:
    a plurality of barb members extending downwardly from the side walls of the lid member, the side walls of the base section each defining at least one slot, each said slot being aligned with one of said barb members when the lid member is pivoted to the closed position closely confronting the side walls of the base section, said barb members being engagingly received with said slots of the base section to secure the lid member in the closed position.

11. The compact disc security holder of claim 10 wherein the number of barb members extending from each of the side walls of the lid member is two and the number of slots defined by each of the side walls of the base section it two, said barb members being positioned such that one barb member is adjacent the end of each side wall of the lid member opposing the end of the lid member connected to the base section, and one barb member is positioned approximately equidistant from each of the opposing ends of the side walls of the lid member.

12. The compact disc security holder of claim 1 wherein the securing means for engagingly securing the lid member in close confronting contact with the base section when the lid member is pivoted to the closed position further comprises:
    a plurality of barb members extending upwardly from the side walls of the base section, the side walls of the lid members each defining at least one slot, each said slot being aligned with one of said barb members when the lid member is pivoted to the closed position closely confronting the side walls of the base section, said barb members being engagingly received within said slots of the lid member to secure the lid member in the closed position.

13. The compact disc security holder of claim 12 wherein the number of barb members extending from each of the side walls of the base section is two and the number of slots defined by each of the side walls of the lid member is two, said slots being positioned such that one slot is adjacent the end of each side wall of the lid member opposing the end of the lid member connected to the base section, and one slot is positioned approximately equidistant from each of the opposing ends of the side walls of the lid member.

14. The compact disc security holder of claim 1 wherein the bottom wall of the base section defines at least one bottom viewing aperture extending completely therethrough, and the top wall of the lid member defines a top viewing aperture extending completely therethrough.

15. The security compact disc holder of claim 14 wherein the number of bottom viewing apertures it two.

16. A compact disc security holder to engagingly receive a first and a second compact disc display packages each having different dimensions, said compact disc security holder comprising:
    a base section, said base section including a pair of opposing side walls and a pair of opposing end walls, each said end wall connected to and extending between each of said side walls, each said side wall defining a lower segment having a top edge and a bottom edge and a height measured therebetween, and a raised segment having a top edge and a bottom edge and a height measured therebetween which is greater than said height of said lower segment, said lower segment of each said side wall of said base section having a length, said side walls and said end walls of said base section defining an interior region of the compact disc security holder;
    a lid member, said lid member having a pair of opposing side walls, said side walls having a pair of opposing ends and a length measured therebetween, said lid member being hingedly connected to the base section adjacent one of the end walls thereof and being pivotable between a closed position whereat each of said side walls of said lid member closely confronts one of the side walls of the base section, and an open position generally displaced from said closed position, each said side wall of lid member having a length being generally displaced from said closed position, each said side wall of said lid member having a length being generally equal to or less than the length of the lower segment of the side wall of the base section confronting said side wall of said lid member when said lid member is pivoted to said closed position;
    securing means for engagingly securing the lid member in close confronting contact with the base section when the lid member is pivoted to the closed position;
    a top wall connected to and extending between the side walls of the lid member, said lid member defining a retaining aperture extending entirely therethrough;
    a bottom wall connected to and extending between the side walls of the base section, said bottom wall and the top wall at least partially enclosing the interior region of the compact disc holder adjacent the lower segment thereof when the lid member is pivoted to the closed position;

at least one tab extending partially inwardly from the top edge of the raised segment of the base section;

at least one tab extending partially inwardly from the bottom edge of the raised segment of the base section, said tab extending partially inwardly from the bottom edge of the raised segment of the base section and the tab extending partially inwardly from the top edge of the raised segment of the base section continuously enclosing the interior region of the compact disc holder adjacent the raised segment thereof; and a pivotal retaining member, said pivotal retaining member being defined by the bottom wall of the base section and being hingedly connected thereto along a first end, said pivotal retaining member having a length greater than the distance between the top wall and the bottom wall when the lid member is pivoted to the closed position, said pivotal retaining member further having a second end opposing said first end and being aligned with and engagingly received within the retaining aperture in the top wall of the lid member when the pivotal retaining member is pivoted to a retaining position generally perpendicular to the bottom wall and the lid member is pivoted to the closed position, such that the pivotal retaining member extends between the top wall of the lid member and the bottom wall of the base section so as to divide the interior region of the compact disc security holder into a first subcompartment and a second subcompartment, said first subcompartment corresponding to the dimensions of the second of the compact disc display packages, whereby the first compact disc display package may be selectively inserted and received within the interior region of the compact disc holder adjacent the lower segment thereof when the lid member is in the open position, at least a portion of the first compact disc display package being slidably receivable within the partially enclosed portion of interior region of the base section adjacent the raised segment thereof, with the pivotal retaining member being pivoted to the retaining position and the second compact disc display package being inserted and received within the base section such that the pivotal retaining member separates the first compact disc display package from the second compact disc display package, with the lid member being pivoted to the closed position and secured thereat with the pivotal member being engagingly received within the retaining aperture in the lid member.

* * * * *